US010200582B2

United States Patent
Karasawa

(10) Patent No.: US 10,200,582 B2
(45) Date of Patent: Feb. 5, 2019

(54) MEASURING DEVICE, SYSTEM AND PROGRAM

(71) Applicant: 3M INNOVATIVE PROPERTIES COMPANY, St. Paul, MN (US)

(72) Inventor: Fumio Karasawa, Tokyo (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 131 days.

(21) Appl. No.: 15/106,175

(22) PCT Filed: Dec. 22, 2014

(86) PCT No.: PCT/US2014/071813
§ 371 (c)(1),
(2) Date: Jun. 17, 2016

(87) PCT Pub. No.: WO2015/100206
PCT Pub. Date: Jul. 2, 2015

(65) Prior Publication Data
US 2016/0321823 A1   Nov. 3, 2016

(30) Foreign Application Priority Data

Dec. 27, 2013 (JP) .................................. 2013-273437

(51) Int. Cl.
*H04N 5/235* (2006.01)
*H04N 5/232* (2006.01)
(Continued)

(52) U.S. Cl.
CPC .............. *H04N 5/232* (2013.01); *G01J 1/42* (2013.01); *G01J 1/4214* (2013.01);
(Continued)

(58) Field of Classification Search
CPC ........ H04N 5/232; H04N 5/2351; H04N 9/07; G06T 2207/10024; G06T 7/408;
(Continued)

(56) References Cited

U.S. PATENT DOCUMENTS 5,267,028 A * 11/1993 Suga ...................... H04N 9/045
348/223.1
5,563,657 A * 10/1996 Suga ...................... H04N 9/045
348/234
(Continued)

FOREIGN PATENT DOCUMENTS

JP     63-229335    9/1988
JP     1-174966     7/1989
(Continued)

OTHER PUBLICATIONS

Luo, "Uniform Colour Spaces Based on CIECAM02 Colour Appearance Model", vol. 31, No. 4, Jan. 12, 2016, pp. 320-330.
(Continued)

*Primary Examiner* — Michael Lee
(74) *Attorney, Agent, or Firm* — X. Christina Huang

(57) ABSTRACT

To provide a device, system, and program with which it is possible for photometric information or colorimetric information corresponding to an international industry standard to be accurately measured in a simple manner. In one embodiment, a measurement apparatus (1) includes: an imaging unit (11) that acquires image data of an image; converters (141, 142) that use image data shooting information to convert the image data into data including photometric information or colorimetric information; and an output unit (16) that outputs the photometric information or the colorimetric information obtained by the converters.

14 Claims, 10 Drawing Sheets

(51) Int. Cl.
| | |
|---|---|
| *H04N 9/07* | (2006.01) |
| *G03B 17/18* | (2006.01) |
| *G01J 1/42* | (2006.01) |
| *G01J 3/50* | (2006.01) |
| *G01J 3/02* | (2006.01) |
| *G01J 3/46* | (2006.01) |
| *G01J 5/02* | (2006.01) |
| *G01J 5/60* | (2006.01) |
| *G06T 7/90* | (2017.01) |
| *G01J 5/00* | (2006.01) |

(52) U.S. Cl.
CPC .......... *G01J 3/0264* (2013.01); *G01J 3/0272* (2013.01); *G01J 3/462* (2013.01); *G01J 3/50* (2013.01); *G01J 5/025* (2013.01); *G01J 5/0265* (2013.01); *G01J 5/60* (2013.01); *G03B 17/18* (2013.01); *G06T 7/90* (2017.01); *H04N 5/2351* (2013.01); *H04N 9/07* (2013.01); *G01J 2005/0077* (2013.01); *G06T 2207/10024* (2013.01)

(58) Field of Classification Search
CPC ... G06T 7/90; G01J 1/42; G01J 1/4214; G01J 3/0264; G01J 3/0272; G01J 3/462; G01J 3/50; G01J 5/25; G01J 5/0265; G01J 5/60; G03B 17/18
USPC ......................................................... 348/135
See application file for complete search history.

(56) References Cited

U.S. PATENT DOCUMENTS

| | | | |
|---|---|---|---|
| 5,565,990 A | 10/1996 | Hosoi | |
| 5,636,143 A | 6/1997 | Takahashi | |
| 6,043,909 A | 3/2000 | Holub | |
| 2001/0016064 A1 | 8/2001 | Tsuruoka | |
| 2006/0067668 A1 | 3/2006 | Kita | |
| 2006/0098108 A1 | 5/2006 | Kurosawa | |
| 2006/0262659 A1 | 11/2006 | Kurosawa | |
| 2009/0041295 A1 | 2/2009 | Matsuzaka et al. | |
| 2010/0188529 A1* | 7/2010 | Tsuruoka | H04N 5/217 348/234 |
| 2011/0013848 A1 | 1/2011 | Hasegawa | |
| 2016/0071267 A1 | 3/2016 | Wakai | |

FOREIGN PATENT DOCUMENTS

| | | |
|---|---|---|
| JP | 6-242487 | 9/1994 |
| JP | 2003-9163 | 1/2003 |
| JP | 2003-149050 A | 5/2003 |
| JP | 2005-33434 | 2/2005 |
| JP | 2006-33159 | 2/2006 |
| JP | 2006-050233 A | 2/2006 |
| JP | 2007-285988 A | 11/2007 |
| JP | 2009-53063 | 3/2009 |
| JP | 2009-089319 A | 4/2009 |

OTHER PUBLICATIONS

Relative luminance, Wikipedia, retrieved from the internet, Mar. 14, 2013, 1 page.
Standard of the Camera & Imaging Products Association, CIPS DC-004-Translation—2004, 31 pages.
International Search Report for PCT International Application No. PCT/US 2014/71813 dated Mar. 20 2015 2 pages.

* cited by examiner

MEASURING DEVICE, SYSTEM AND PROGRAM

This application claims the benefit of Japan Application No. 2013-273437, filed Dec. 27, 2013, the entire content of which being incorporated herein by reference.

TECHNICAL FIELD

The present disclosure relates to a measuring apparatus, a system, and a program.

BACKGROUND

Patent Document 1 describes a photometric device such as a luminance meter that measures the amount of radiated light and reflected light from a comparatively minute portion within a specific field of view seen from the position of a measurement instrument. Furthermore, Patent Document 2 describes a color thermometer for photography that measures the color temperature of flash light used for taking photographs. Patent Document 3 describes a color meter (color measurement instrument) that measures the light of a photographic light source or the like and outputs, for example, color correction information for photographing. Patent Document 4 describes a camera that measures the color temperature of a light source that illuminates a field, and displays color temperature information on the basis of that output.

PRIOR ART DOCUMENTS

Patent Document 1: Japanese Unexamined Patent Application Publication No. S63-229335
Patent Document 2: Japanese Unexamined Patent Application Publication No. H05-223643
Patent Document 3: Japanese Unexamined Patent Application Publication No. 2009-053063
Patent Document 4: Japanese Unexamined Patent Application Publication No. H06-242487

SUMMARY

Extremely expensive special measurement instruments are necessary to measure the intensity or color of light based on an international industry standard such as those of the International Commission on Illumination (CIE). However, if a suitable method were established, photometric information or colorimetric information could be calculated from the data of an image taken by a digital camera currently on the market. Although technologies such as cameras provided with color thermometers have been proposed, these are mainly intended for taking beautiful photographs, and there are no known apparatus that measure the intensity or color of light for any point of a subject in a simple manner, and output the measurement result in such a way that the measurement result can be applied in other applications.

Therefore, an objective of the present disclosure is to provide an apparatus, a system, and a program with which it is possible for photometric information or colorimetric information corresponding to an international industry standard to be accurately measured in a simple manner.

Means to Solve the Problem

An apparatus according to the present disclosure includes: an imaging unit that acquires image data of an image; a converter that uses image data shooting information to convert the image data into data including photometric information or colorimetric information; and an output unit that outputs the photometric information or the colorimetric information obtained by the converter.

In the apparatus, it is preferable to further include a position designation unit that designates the position of a pixel included in the image, and for the output unit to be a display unit that displays the photometric information or the colorimetric information obtained by the converter for the pixel designated by the position designation unit.

In the apparatus, it is preferable for the converter to include: a first converter that converts the image data of the image acquired by the imaging unit into data including a relative luminance value; a reference luminance value acquiring unit that uses the image data shooting information to obtain a reference luminance value of a subject included in the image; and a second converter that uses the reference luminance value to convert the relative luminance value into an absolute luminance value. It is also preferable for the display unit to display the absolute luminance value obtained by the second converter.

In the apparatus, it is preferable for the second converter to obtain a linear relative luminance value by converting the relative luminance value into a linear scale, and to use the reference luminance value to convert the linear relative luminance value into the absolute luminance value.

In the apparatus, it is preferable for the display unit to display absolute luminance values for each of the pixels of the image by means of colors that differ in accordance with a plurality of discretely set sections to which an absolute luminance value belongs.

In the apparatus, it is preferable for the converter to extract the image information from image information associated with the image data acquired by the imaging unit.

In the apparatus, it is preferable for the converter to include a third converter that uses the image information to convert color information of a color space included in the image data of the image acquired by the imaging unit, into color information of another color space. It is also preferable for the display unit to display the values of the color information of the other color space obtained by the third converter.

In the apparatus, it is preferable for the image information to be image information associated with the image data.

In the apparatus, it is preferable for the converter to further include a fourth converter that converts the color information of the other color space obtained by the third converter, into yet another color space. It is also preferable for the display unit to display the values of the color information of the yet another color space obtained by the fourth converter.

In the apparatus, it is preferable for the converter to further include: a third converter that uses the image information to convert color information of a color space included in the image data of the image acquired by the imaging unit, into color information of another color space; and a fifth converter that converts the absolute luminance value obtained by the second converter for each of a plurality of points in the image, and the color information of the other color space obtained by the third converter, into color information of a color space of a color appearance model. It is also preferable for the display unit to display the values of the color information obtained by the fifth converter.

In the apparatus, it is preferable for the converter to further include: a third converter that uses the image information to convert color information of a color space included in the image data of the image acquired by the imaging unit, into color information of another color space; a fourth converter that converts the color information of the other color space obtained by the third converter, into yet another color space; and a fifth converter that converts the absolute luminance value obtained by the second converter for each of a plurality of points in the image, and the color information of the yet another color space obtained by the fourth converter, into color information of a color space of a color appearance model. It is also preferable for the display unit to display the values of the color information obtained by the fifth converter.

In the apparatus, it is preferable to further include an analysis unit that analyzes the relative relationship of the photometric information or the colorimetric information of the plurality of points on the basis of the data including the photometric information or the colorimetric information of the plurality of points converted by the converter. It is also preferable for the display unit to display the values obtained by the analysis unit.

In the apparatus, it is preferable to further include: a memory unit that stores reference information in which colorimetric information and an identification value are associated for each of a plurality of colors; and an extraction unit that refers to the reference information and thereby extracts, for the pixel designated by the position designation unit, the identification value of a color corresponding to the colorimetric information closest to the colorimetric information obtained by the converter. It is also preferable for the display unit to display the identification value of the color extracted by the extraction unit.

A system according to the present disclosure is a system including an imaging device, a conversion device, and a display device capable of communicating with each other. The imaging device includes an imaging unit that acquires image data of an image, and a transmission unit that transmits the image data of the image acquired by the imaging unit and image data shooting information to the conversion device. The conversion device includes a converter that uses the image data shooting information to convert the image data into data including photometric information or colorimetric information, and a communication unit that receives the image data and the image information from the imaging device, and transmits the photometric information or the colorimetric information obtained by the converter to the display device. The display device includes a reception unit that receives the photometric information or the colorimetric information from the conversion device, and a display unit that displays the photometric information or the colorimetric information received by the reception unit.

A program according to the present disclosure instructs a computer to acquire image data of an image taken by an imaging device and image data shooting information, convert the image data into data including photometric information or colorimetric information by using the image information, and output the photometric information or the colorimetric information.

Effect of the Solutions

According to the apparatus, the system, and the program of the present disclosure, photometric information or colorimetric information corresponding to an international industry standard can be accurately measured in a simple manner.

DETAILED DESCRIPTION

Figure 1:
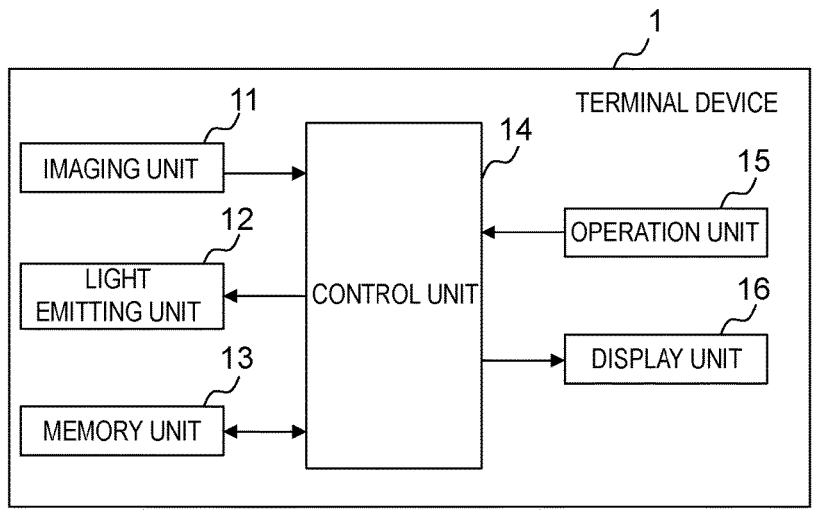
FIG. 1 is a schematic configuration of one embodiment of a terminal device 1.

FIG. 1 is a schematic configuration of one embodiment of a terminal device 1. The terminal device 1 includes an imaging unit 11, a light emitting unit 12, a memory unit 13, a control unit 14, an operation unit 15, and a display unit 16. The terminal device 1 is, for example, a mobile terminal such as a smart phone equipped with a camera.

The imaging unit 11 captures a measurement-target image, and acquires measurement-target image data in a format such as RAW (DNG) data, JPEG (JFIF) data, or sRGB data. The data format may be any of these, but hereinafter, an example is mainly described in which the imaging unit 11 acquires JPEG (JFIF) data.

The light emitting unit 12, if necessary, emits light when an image is being taken by the imaging unit 11. The light emitting unit 12 can emit various types of visible or invisible lights, for example, visible light, fluorescent light, ultraviolet light, infrared light, or the like. The memory unit 13 is, for example, a semiconductor memory that stores the image data taken by the imaging unit 11, data necessary for operation of the terminal device 1, and the like.

The control unit 14 includes a CPU, RAM, ROM, and the like, and controls the operation of the terminal device 1. The operation unit 15 includes, for example, a touch panel, a keyboard, or the like, and receives operations from a user. The operation unit 15 is an example of a position designation unit, and receives a user operation that designates the position of a pixel included in an image.

The display unit 16 is, for example, a liquid crystal display, and may be integrated with the operation unit 15 as a touch panel display. The display unit 16 is an example of an output unit, and displays photometric information or colorimetric information obtained by the control unit 14, for the pixel designated by the user via the operation unit 15. The photometric information is a measurement-target absolute luminance value, and is expressed in units such as nit, $cd/m^2$, ftL, or the like. Furthermore, the colorimetric information is a measurement-target CIE XYZ value, an RGB value, a color temperature (K), or a spectral distribution.

It should be noted that the terminal device 1 may output the photometric information or the colorimetric information by means of other than displaying, such as audio. Furthermore, the terminal device 1 may output the photometric information or the colorimetric information to another device in such a way that the user is able to analyze the measurement results with the other device.

Figure 2:
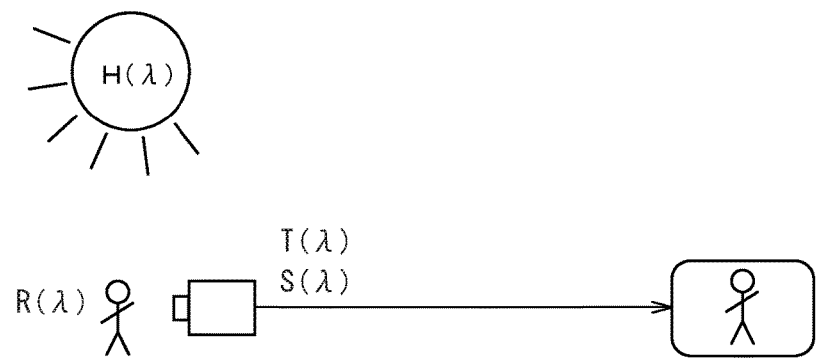
FIG. 2 is a drawing for describing an overview of the functions of the terminal device 1.
Figure 2:
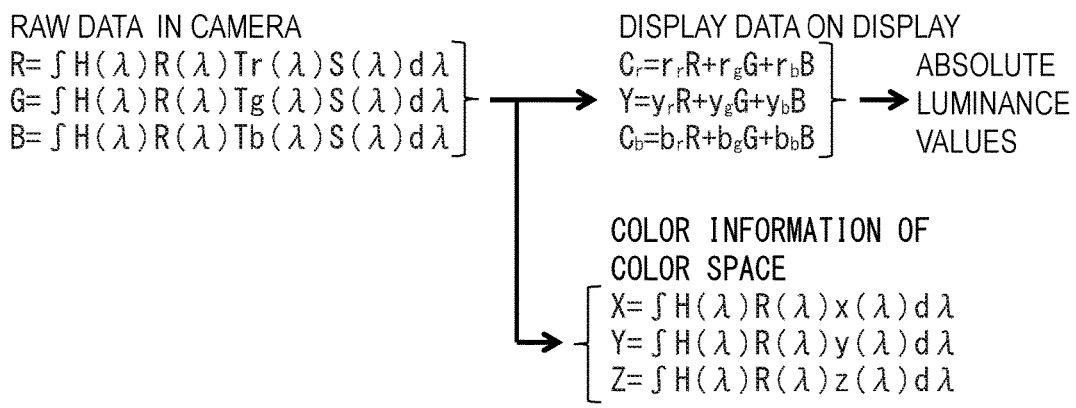

FIG. 2 is a drawing for describing an overview of the functions of the terminal device 1. When an image is acquired by a digital camera, light and color information is converted as in FIG. 2. H(λ) is the spectral intensity of a light source, R(λ) is the spectral reflectance of a subject, T(λ) is the spectral transmittance having passed through a camera lens equipped with a filter, and S(λ) is the spectral sensitivity of a camera sensor. These amounts are recorded together as RGB RAW (DNG) data as depicted by the equations in the drawing. However, in order to reduce image data size, RAW data is converted into another format, for example, such as JPEG, TIF, or the like. A light source may include, for example, visible light source, fluorescent light source, ultraviolet light source, infrared light source, or the like.

The terminal device 1 obtains, by means of the calculations described hereinafter, absolute amounts such as the color temperature (K) of the subject, a CIE XYZ value, and an absolute luminance value (nit) from RGB data such as RAW data and JPEG data obtained by capturing a measurement-target image. The terminal device 1, for example, then displays the numerical values of the measurement results on the display unit 16 in real time together with the measurement-target image. The photometric information or the colorimetric information can therefore be measured in a simple manner by a mobile terminal such as a smart phone equipped with a camera, for example.

Figure 3:
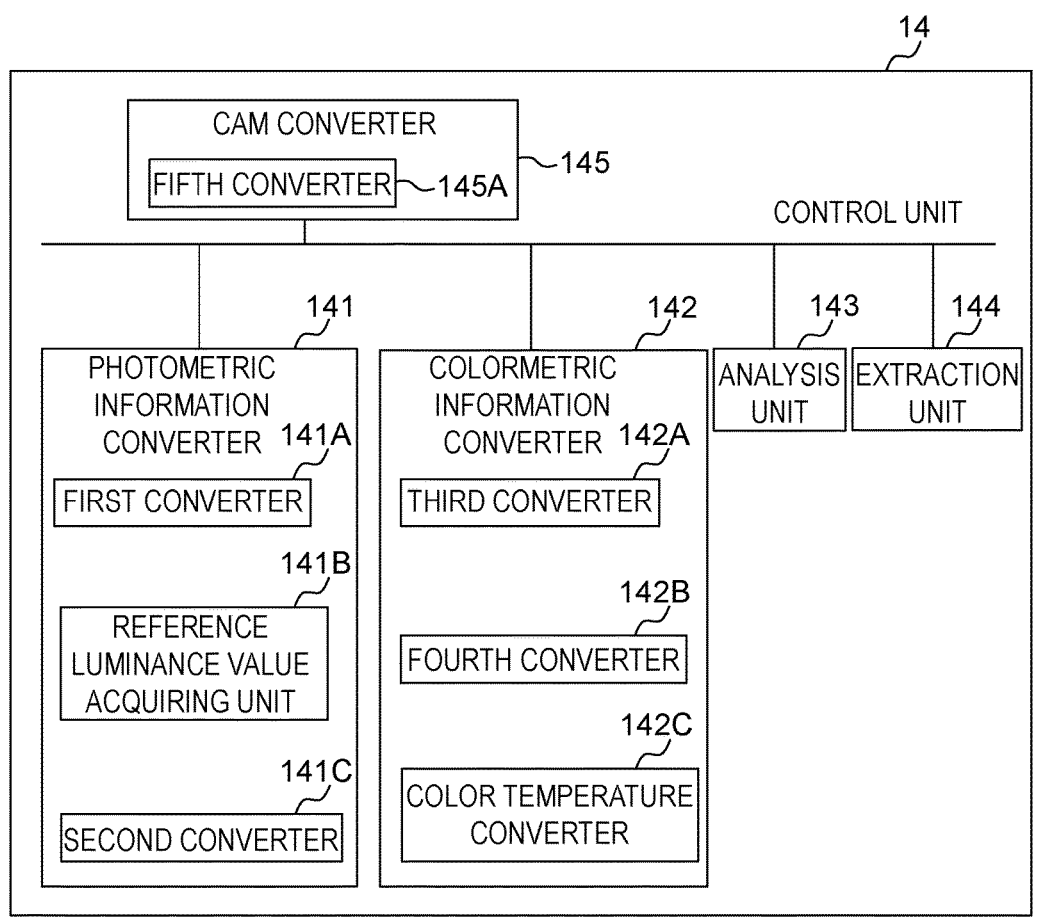
FIG. 3 is a functional block diagram of one embodiment of a control unit 14.

FIG. 3 is a functional block diagram of one embodiment of the control unit 14. The control unit 14 includes, as a functional block, a photometric information converter 141, a colorimetric information converter 142, an analysis unit 143, an extraction unit 144, and a CAM converter 145.

The photometric information converter 141 includes a first converter 141A, a reference luminance value acquiring unit 141B, and a second converter 141C. The photometric information converter 141 is an example of a converter, and uses the image information of image data such as the effective aperture value (F-number) of the imaging unit 11, shutter speed, ISO sensitivity, focal distance, and photographing distance to convert the image data acquired by the imaging unit 11 into data including an absolute luminance value (photometric information). At such time, the photometric information converter 141, for example, extracts the image information from Exif data associated with the image data acquired by the imaging unit 11.

Figure 4:
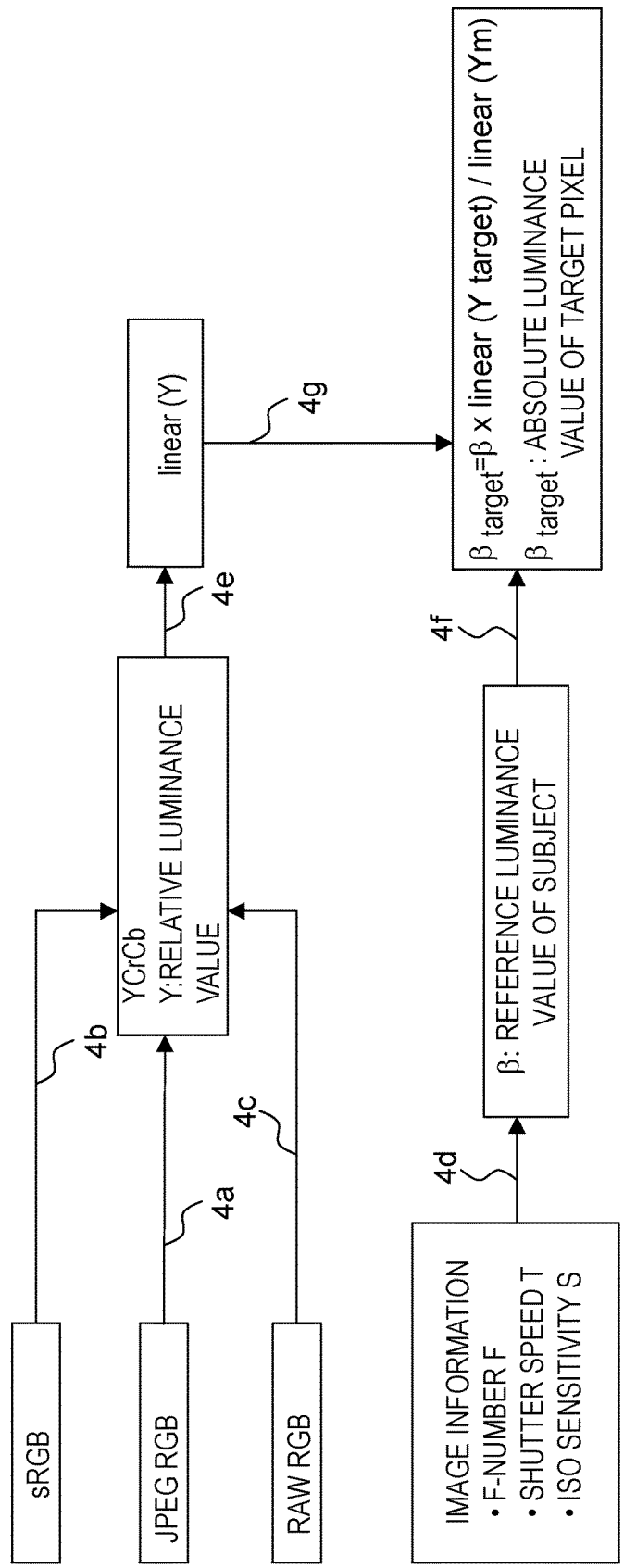
FIG. 4 is a relational diagram of data used by one embodiment of a photometric information converter 141.

FIG. 4 is a relational diagram of data used by one embodiment of the photometric information converter 141. The first converter 141A converts JPEG data of the image acquired by the imaging unit 11 into YCrCb data including a relative luminance value (arrow 4a). The value of a luminance signal Y is the relative luminance value. At such time, the first converter 141A may convert the JPEG data into YCrCb data in accordance with a conversion table stipulated by the well-known IEC 61966-2-1 standard. It should be noted that if the image data is sRGB data, the first converter 141A may perform conversion in accordance with a conversion table stipulated by a well-known standard (arrow 4b). Furthermore, with regard to RAW data, the first converter 141A may perform conversion using a conversion table provided by the manufacturer that manufactured the imaging unit 11 (arrow 4c).

The reference luminance value acquiring unit 141B uses the image data shooting information to obtain a reference luminance value β of the subject included in the image acquired by the imaging unit 11. If the effective aperture value (F-number) of the imaging unit 11 is taken as F, the shutter speed as T (seconds), and the ISO sensitivity as S, the reference luminance value β (cd/m² or nit) of the subject when the average reflectance of the whole screen is assumed to be 18% is expressed by the following equation, $$\beta = 10 \times F^2 / (k \times S \times T) \tag{1}$$

wherein k is a constant, and a value such as 0.65 is used. The reference luminance value acquiring unit 141B uses this equation to calculate the reference luminance value β from the values for the effective aperture value (F-number) F, shutter speed T (seconds), and ISO sensitivity S (arrow 4d).

Usually, the image information of F, S, and T is recorded within the Exif data associated with the RAW data, the JPEG data, and the like. The reference luminance value acquiring unit 141B therefore extracts F, S, and T from this Exif data and calculates the reference luminance value β. Thus, it is no longer necessary for the user to manually input image information, and convenience for the user therefore improves. However, when Exif data cannot be used, the user inputs the F, S, and T values via the operation unit 15, and the reference luminance value acquiring unit 141B acquires those input values.

The second converter 141C uses the reference luminance value β to convert a relative luminance value Y into an absolute luminance value. At such time, the second converter 141C first obtains a linear relative luminance value linear(Y) by converting the relative luminance value Y into a linear scale (arrow 4e). The second converter 141C then uses the reference luminance value β calculated by the reference luminance value acquiring unit 141B to convert the linear relative luminance value linear($Y_{target}$) of each measurement-target pixel into an absolute luminance value $\beta_{target}$ (arrows 4f, 4g).

Generally, the RGB values of each of the pixels displayed on a display are converted into a non-linear scale by means of gamma correction in order to compensate for the nonlinearity of the display. Therefore, when using RGB values that are not of a linear scale, the second converter 141C uses a representative gamma correction value, 2.2 for example, to convert the luminance signals Y (non-linear values) of each of the pixels calculated by the first converter 141A into linear(Y) of a linear scale by means of the following equation.

$$\text{linear}(Y) = Y^{2.2} \tag{2}$$

If gamma correction is performed in this way, there is an advantage in that it becomes easier to perform high-speed processing of multiple points and multiple values. It goes without saying that the second converter 141C can convert a relative luminance value Y into a linear scale by means of a method specific to each color space, not limited to equation (2).

If the reference luminance value $\beta_{target}$ when the reflectance is 18% is obtained, the second converter 141C calculates the absolute luminance value $\beta_{target}$ of the target pixel by means of the following equation from the linear relative luminance value linear ($Y_{target}$) of the target pixel.

$$\beta_{target} = \beta \times \text{linear}(Y_{target}) / \text{linear}(Y_m) \tag{3}$$

Here, linear($Y_m$) is the linear relative luminance value (reference level) when the average reflectance of the whole screen is assumed to be 18%. In the case of an 8-bit system from 0 to 255, this reference level becomes 46 (maximum value 255×0.18) in accordance with the 2.2 gamma standard for the display and the stipulation of an 18% average reflectance, and the following is therefore established.

$$\text{linear}(Y_m) = 46/255$$

In some cases, the value of the absolute luminance value $\beta_{target}$ obtained by the second converter 141C is displayed on the display unit 16. If it is possible to use the image information of the Exif data, or if information corresponding thereto is input manually by the user, the absolute luminance value $\beta_{target}$ can be obtained and displayed for the pixels of each coordinate on an image, from any of sRGB or RGB of JPEG data, and RGB of RAW data. With relative luminance values, it is not possible to compare the intensity of brightness within the same image. However, with absolute luminance values, it is possible to compare the intensity of brightness even with a different image acquired at a completely different time and under different illumination conditions.

It should be noted that the second converter 141C may, with respect to a final absolute luminance value $\beta_{target}$, use angle of view information obtained from the focal distance of the photographing lens of the imaging unit 11 and the size of the imaging element to perform a correction relating to reducing the amount of peripheral light by means of a well-known method such as the so-called cosine fourth law, for example. The accuracy of the absolute luminance value can therefore be improved.

Figure 5:
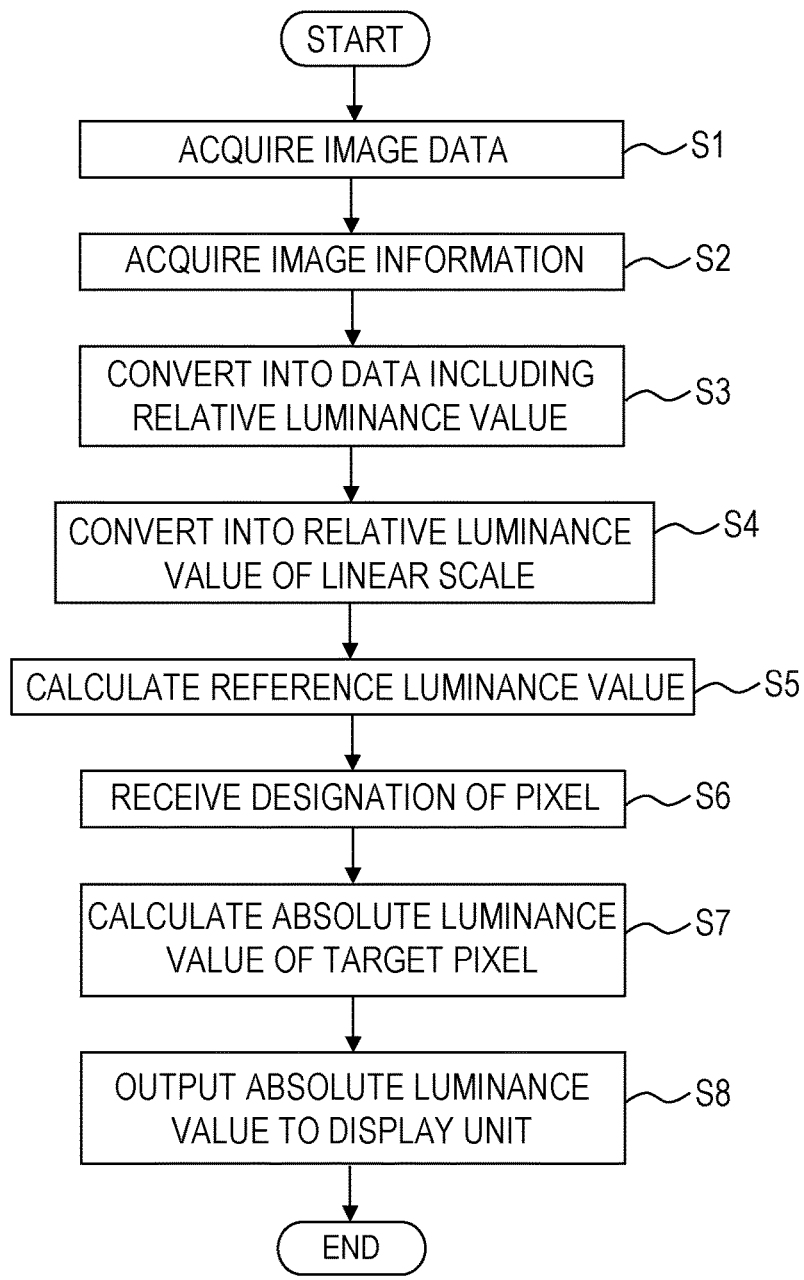
FIG. 5 is a flowchart showing an example of conversion processing of an absolute luminance value.

FIG. 5 is a flowchart showing an example of conversion processing of an absolute luminance value. The processing for each of the steps of FIG. 5 is executed in cooperation with each of the elements of the terminal device 1, by the photometric information converter 141 of the control unit 14, on the basis of a program stored in the memory unit 13, for example.

First, the photometric information converter 141 acquires image data of an image captured by the imaging unit 11 (step S1). It should be noted that the terminal device 1 can also perform real-time processing for the image data continuously acquired by the imaging unit 11, not limited to a single still picture (photograph). In this case, the photometric information converter 141 acquires image data continuously captured by the imaging unit 11 at time intervals that cannot be perceived by the human eye.

The photometric information converter 141 then acquires image information of the acquired image data (step S2). It is preferable for this image information to be acquired from the image data. If there is no image data, the photometric information converter 141 acquires image information that is input by the user via the operation unit 15.

Next, the first converter 141A converts the image data (RGB data) acquired in step S1 into a desired data type, for example, YCrCb data, including a relative luminance value (step S3). The second converter 141C then converts luminance signals Y of each of the pixels calculated in step S3 into linear(Y) of a linear scale, for example, by means of equation (2) (step S4).

Furthermore, the reference luminance value acquiring unit 141B extracts the values for the effective aperture value (F-number) F, shutter speed T, and ISO sensitivity S of the imaging unit 11 from the image information acquired in step S2. For example, the reference luminance value acquiring unit 141B uses equation (1) to calculate a reference luminance value $\beta$ from the values for the extracted effective aperture value (F-number) F, shutter speed T, and ISO sensitivity S (step S5).

Here, the photometric information converter 141 receives an operation with which the user designates a measurement-target pixel via the operation unit 15 (step S6). The second converter 141C then, from the linear relative luminance value linear($Y_{target}$) for the target pixel received in step S6 from among the linear relative luminance values linear(Y) obtained in step S4, calculates the absolute luminance value $\beta_{target}$ of the target pixel by means of equation (3) (step S7). The second converter 141C then outputs and displays the absolute luminance value $\beta_{target}$ calculated in step S7 on the display unit 16 (step S8). The conversion processing for the absolute luminance value then ends.

Since a conventional measurement instrument measures the value of one point having a size on a finder, if the measurement values of a plurality of points or the average value thereof is required, it is necessary to measure each of the points separately, and to record the results and then calculate the average. However, in the terminal device 1, the position of a measurement point and the number of points to be simultaneously measured and the like can be freely selected, and the size of the measurement range can also be freely selected from pixel units to the entirety of the screen. It therefore becomes possible to simultaneously measure the absolute luminance values of a plurality of points for example, and to obtain the average value of the measurement values across a certain region in a simple manner. According to the terminal device 1, an absolute luminance value can be acquired in a simple manner using a programmable digital camera such as a camera of a smart phone instead of a special measurement instrument, and use therefore expands in fields such as lighting, displays, and signboards in which absolute luminance has to be measured as a quality condition.

Figure 6:
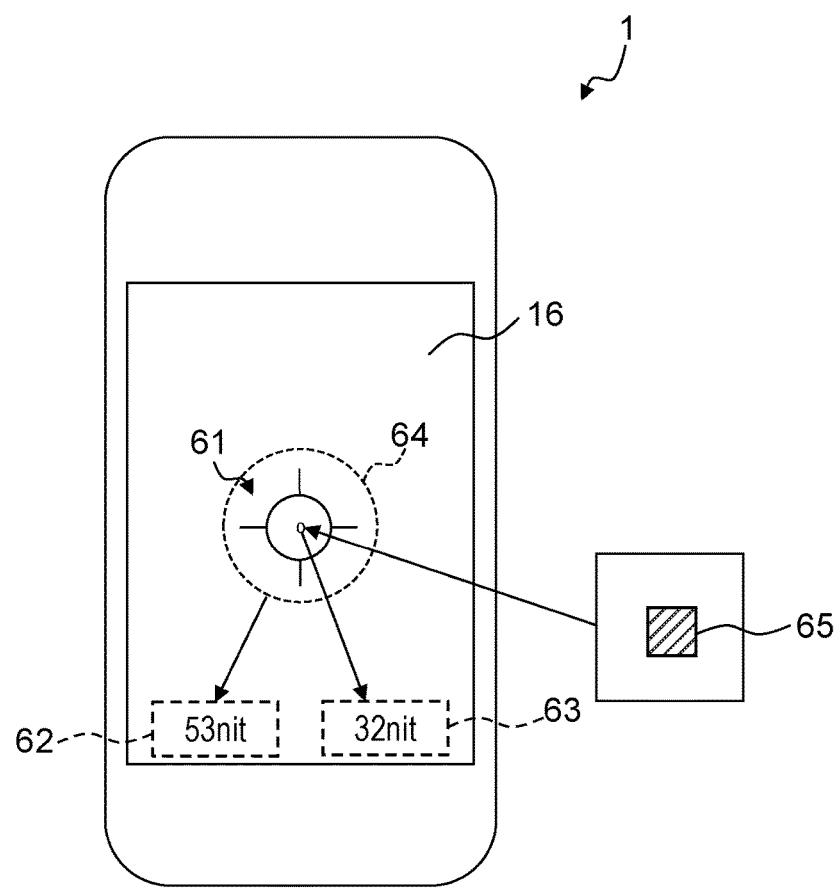
FIG. 6 is a drawing illustrating an example of a display screen for absolute luminance values.

FIG. 6 is a drawing illustrating an example of a display screen for absolute luminance values. In the screen of FIG. 6, in the display unit 16, a marker 61 indicating a measurement region and two luminance values 62 and 63 are superimposed and displayed on an image captured by the imaging unit 11. The luminance value 62 on the left side is the average absolute luminance value of the four line portions displayed within the dashed-line circle 64 (viewing angle 10 to 20° C.). Furthermore, the luminance value 63 on the right side is the absolute luminance value of one pixel 65 (viewing angle 0.035° C.) in the center of the dashed-line circle 64. These luminance values 62 and 63 are measured continuously or both at the same time by means of the conversion processing of FIG. 5 for images captured sequentially by the imaging unit 11.

In the example of FIG. 6, for example, the marker 61 displayed on the display unit 16 of the touch panel may be implemented in such a way that the user can move the marker 61 with a finger or the like, and the luminance value of the point displayed at the position of the moved marker 61 may be output to the display unit 16 by the photometric information converter 141. Alternatively, after the user has moved the terminal device 1 in such a way that the measurement target is in the center (the position of the marker 61) of the image captured by the imaging unit 11, the photometric information converter 141 may output the luminance value of that measurement target to the display unit 16.

In this way, in the terminal device 1, it is possible to calculate and display the luminance value of any pixel in a captured image, and the average luminance value of the entirety of the image.

Furthermore, the luminance values of each of the pixels of an image captured by the imaging unit 11 may be displayed as a monochrome luminance image on the display unit 16. Alternatively, a luminance image may be displayed as a heat map that is colored in such a way that the luminance image becomes increasingly red as the luminance value increases, and becomes increasingly blue as the luminance value decreases.

However, in a heat map in which the color continuously changes in accordance with the magnitude of the luminance values, it is sometimes difficult to identify a pixel region in which luminance values are within a certain range. For example, in the case where the range of luminance values of interest is limited, if all pixels having a luminance value within that range are image-displayed using the same shade, the pixels having a luminance value within that range can be easily identified. Therefore, in the terminal device 1, absolute luminance values for each of the pixels of an image taken by the imaging unit 11 are displayed on the display unit 16 by means of colors that differ in accordance with a plurality of discretely set sections to which the absolute luminance value in question belongs.

Figure 7:
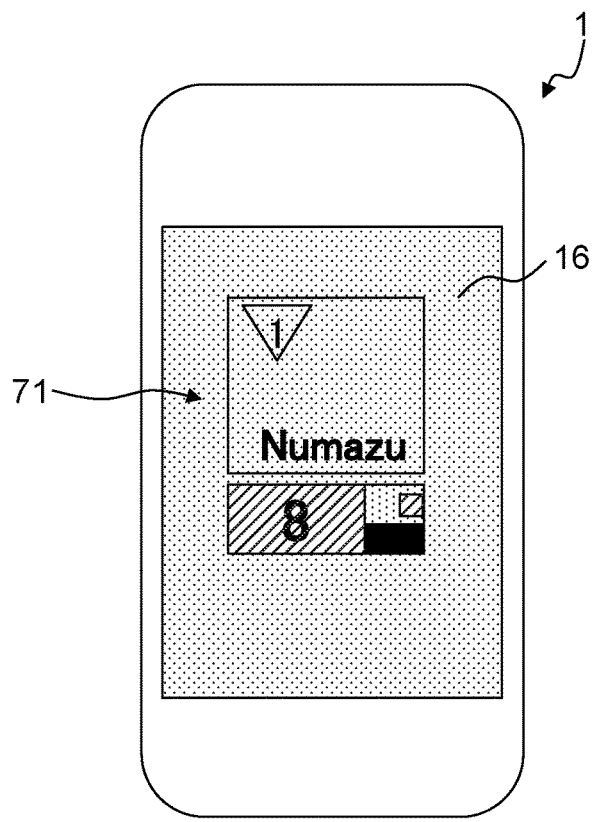
FIG. 7 is a drawing illustrating a display example of an absolute luminance value level map.

FIG. 7 is a drawing illustrating a display example of an absolute luminance value level map. In the center of FIG. 7, a square sign 71 that is divided into two upper and lower portions is displayed. FIG. 7 is an example of a level (contour line) map in which the magnitude of absolute luminance values calculated by the photometric information converter 141 are divided into three colors and displayed for an image in which the sign 71, which has a retroreflective function, has been lit by the illumination of the headlights of an automobile and captured.

In the level map of FIG. 7, the oblique line section is expressed using blue for example, and corresponds to a pixel region that meets a required level for luminance values. Furthermore, the portion depicted using dots is expressed using red for example, and corresponds to a pixel region in which luminance values do not meet the required level. Furthermore, the black portion is expressed using yellow for example, and corresponds to a pixel region in which luminance values are between those of the oblique line section (blue region) and the dotted portion (red region). In this example, the dotted portion (red region) has a luminance level of less than 3.5 nit, the black portion (yellow region) has a luminance level of 3.5 nit or greater and less than 8.0 nit, and the oblique line section (blue region) has a luminance level of 8.0 nit or greater.

The light intensity when a retroreflective film attached on the sign is lit by the headlights of an automobile at night has to be maintained at a specific level or thereabove. In the case of the level map of FIG. 7, the user is able to easily identify the relationship between the intensity of light reflected by the retroreflective film attached to the sign 71 and the required level for luminance values, from the colors of the sign portion of the level map. For example, because the upper side portion of the sign 71 is a dotted portion (red region) in FIG. 7, it is understood that the intensity of the reflected light of that portion has decreased to less than the lower limit 3.5 nit of the required level, and that deterioration of the retroreflective film is progressing. Meanwhile, because the majority of the lower side of the sign 71 is an oblique line section (blue region), it is understood that the intensity of the reflected light of that portion is equal to or greater than the upper limit 8.0 nit of the required level.

It should be noted that in a monochrome luminance image, it is permissible to identify pixel regions in which absolute luminance values are within a specific region, by coloring and displaying pixels in which the absolute luminance value has become equal to or greater than a specific value (overscaled), for example.

Returning to FIG. 3, another functional block of the control unit 14 is described. The colorimetric information converter 142 includes a third converter 142A, a fourth converter 142B, and a color temperature converter 142C. The colorimetric information converter 142 is an example of a converter, and uses the image information of image data such as the color temperature of a light source or illumination light, and the spectral light intensity distribution of the light source or the illumination light, to convert the image data acquired by the imaging unit 11 into data including CIE XYZ values, RGB values, color temperatures, and the like (colorimetric information). At such time, the colorimetric information converter 142, for example, extracts the image information from Exif data associated with the image data acquired by the imaging unit 11. The terminal device 1 can therefore display on the display unit 16 not only luminance values but also the color information of a color space.

Figure 8:
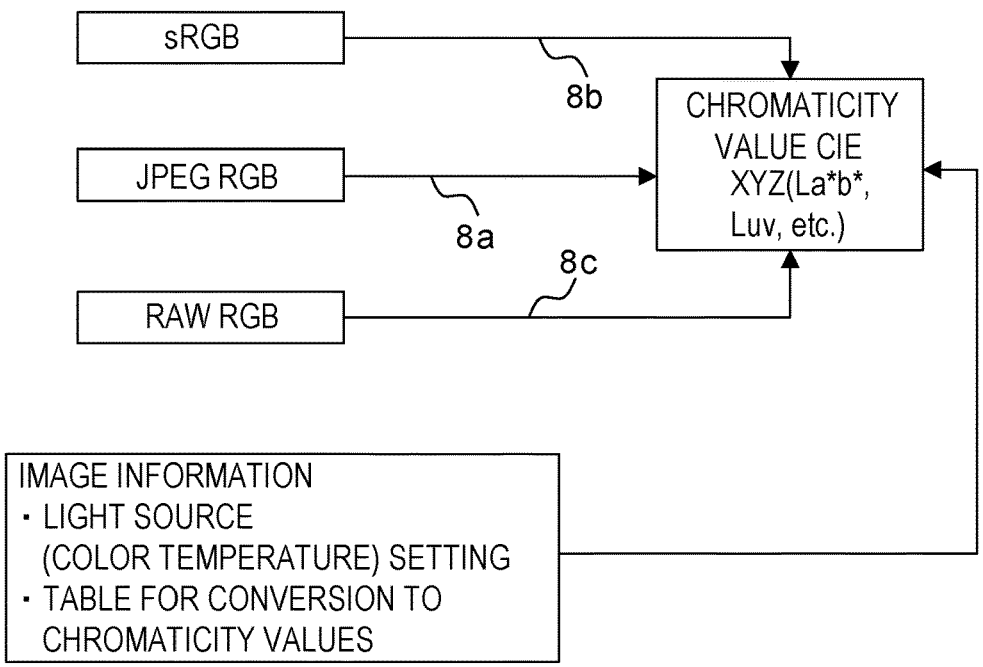
FIG. 8 is a relational diagram of data used by one embodiment of a colorimetric information converter 142.
Figure 9:
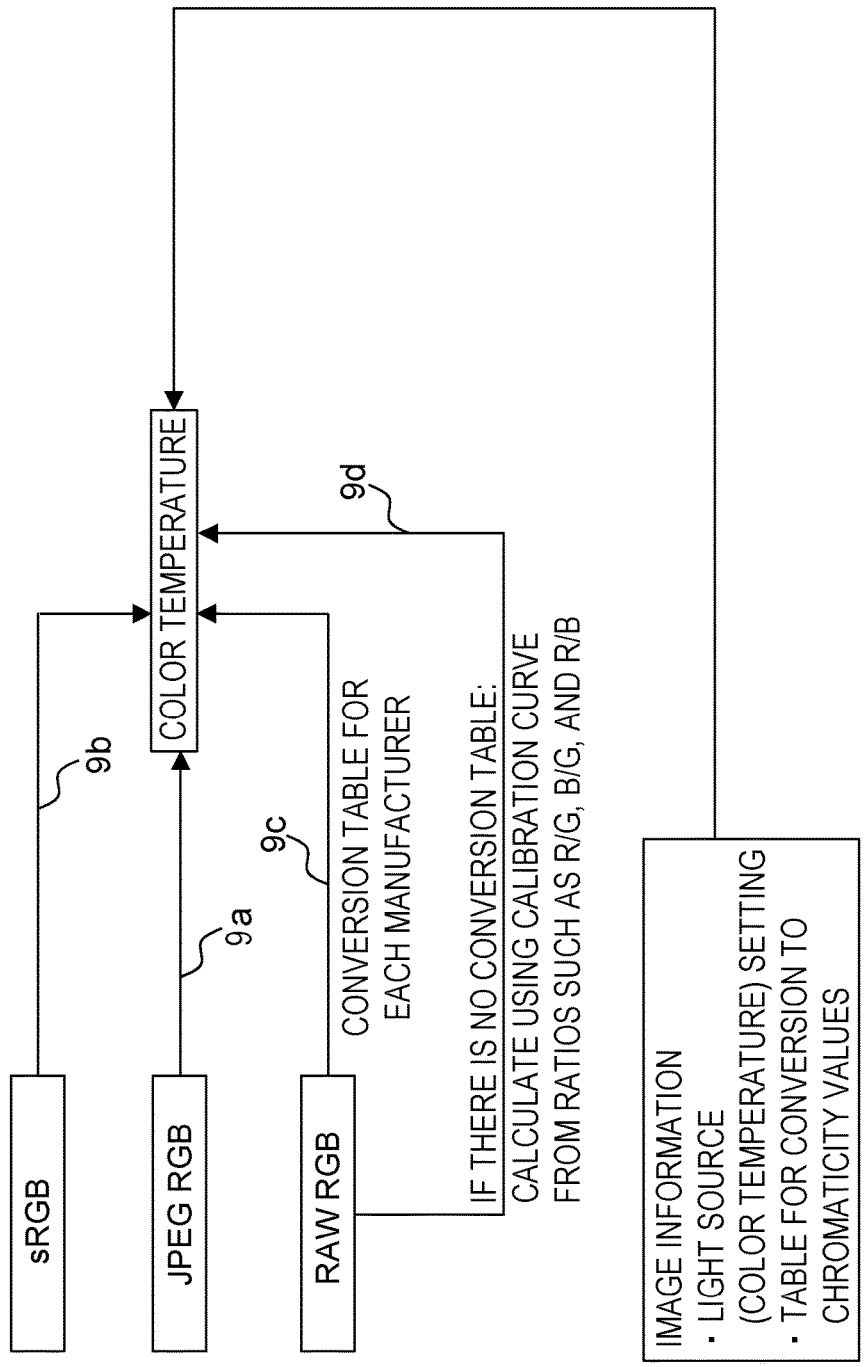
FIG. 9 is a relational diagram of data used by one embodiment of the colorimetric information converter 142.

FIG. 8 and FIG. 9 are data diagrams used by one embodiment of the colorimetric information converter 142. In particular, FIG. 8 is a drawing illustrating the case where RGB data is converted into chromaticity values such as CIE XYZ values, and FIG. 9 is a diagram illustrating the case where RGB data is used to determine color temperature.

The third converter 142A uses image information such as the color temperature of a light source or illumination light, and the spectral light intensity distribution of the light source or the illumination light, to convert color information of a color space included in JPEG data of an image acquired by the imaging unit 11, into color information of another color space (arrow 8a). For example, the color information of the color space before conversion is RGB values, and the color information of the other color space after conversion is CIE XYZ values. The third converter 142A, for example, uses the coefficients $x_r$, $x_g$, $x_b$, $y_r$, $y_g$, $y_b$, $z_r$, $z_g$, and $z_b$ of a color conversion matrix included in Exif data to convert RGB values into CIE XYZ values by means of a matrix transform such as the following equation.

$$\begin{pmatrix} X \\ Y \\ Z \end{pmatrix} = \begin{pmatrix} x_r & x_g & x_b \\ y_r & y_g & y_b \\ z_r & z_g & z_b \end{pmatrix} \begin{pmatrix} R \\ G \\ B \end{pmatrix}$$

It should be noted that the third converter 142A may convert JPEG data into CIE XYZ values in accordance with a conversion table stipulated by the well-known IEC 61966-2-1 standard. The third converter 142A may also perform conversion in accordance with a conversion table stipulated by a well-known standard if the image data is sRGB data (arrow 8b). Furthermore, with regard to RAW data, the third converter 142A may perform conversion using a conversion table provided by the manufacturer that manufactured the imaging unit 11 (arrow 8c).

In some embodiments, the values of the color information of the other color space obtained by the third converter 142A are displayed on the display unit 16. As described above, when conversion is performed using image information obtained from Exif data associated with image data, the color information is represented. Furthermore, if the spectral distribution of the light emitting unit 12 is known, the color information is likewise represented by using the spectral data of the spectral distribution of the light emitting unit 12 as image information.

The fourth converter 142B converts the color information (CIE XYZ values) of the other color space obtained by the third converter 142A into color information of yet another color space. Here, the color information of the yet another color space is, for example, values of CIE Lab, L*a*b*, Luv, or L*u*v*, or is Munsell values. For example, the fourth converter 142B performs conversion from CIE XYZ into L*a*b* in accordance with the definition of CIE 1976 L*a*b* color space and a JIS standard (JIS Z8729) in which this definition is incorporated.

The values of the color information of the yet another color space obtained by the fourth converter 142B are displayed on the display unit 16. For example, to calculate a standard color difference (ΔE in the L*a*b* color space), first, it is necessary for perform conversion from CIE XYZ into chromaticity values of the L*a*b* color space. By means of the fourth converter 142B, it becomes possible to perform conversion into various color spaces in accordance with the objective.

The color temperature converter 142C converts RGB values included in JPEG data of the image acquired by the imaging unit 11, into a color temperature (K) in accordance with a well-known JIS standard (JIS Z8725) or the like (arrow 9a). For example, if a light source or an achromatic subject to be measured is captured, the color temperature converter 142C can use the color temperature locus of the light source on a CIE xy chromaticity diagram to obtain the color temperature on the basis of the chromaticity coordinate values of a reference white color point included in Exif data associated with the JPEG (JFIF) data.

In the case where the image data is sRGB data, the color temperature converter 142C acquires, from the image information, information such as the above for determining a color temperature, and performs conversion into a color temperature in the same way as with JPEG data (arrow 9b). Furthermore, with respect to RAW data, the color temperature converter 142C performs conversion using a conversion table provided by the manufacturer that manufactured the imaging unit 11 (arrow 9c). It should be noted that, depending on the manufacturer of the imaging unit 11, the color temperature set when an image is being taken is sometimes recorded in Exif data. If this kind of imaging unit 11 is used, by merely extracting a color temperature from Exif data, the color temperature converter 142C can acquire a color temperature even without performing conversion.

Figure 10A:
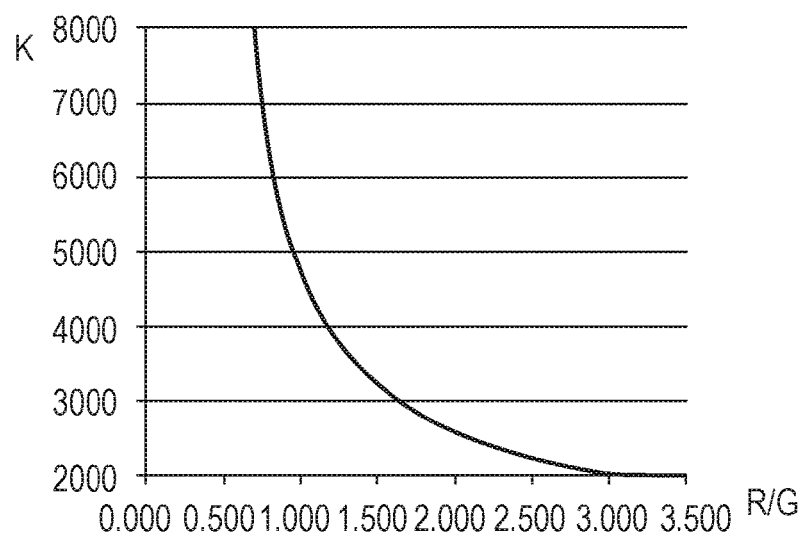
FIG. 10 is a graph showing a calibration curve used for the conversion of a color temperature.
Figure 10B:
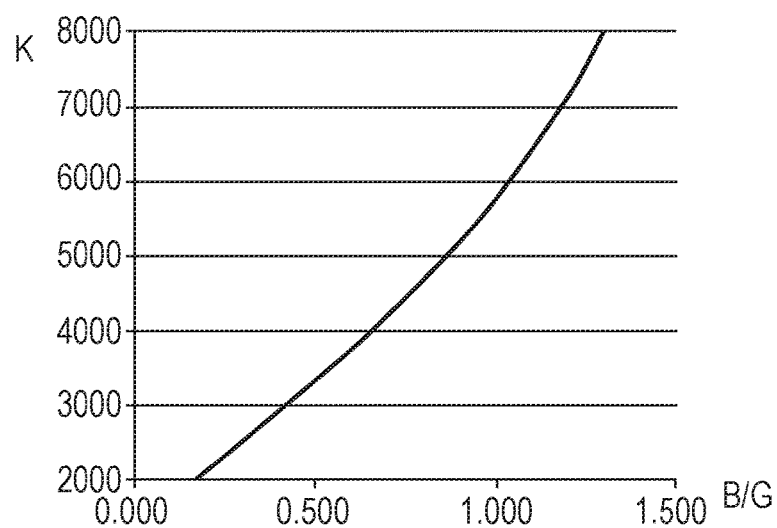

FIG. 10A and FIG. 10B are graphs showing calibration curves used for the conversion of a color temperature. FIG. 10A shows a graph of a function f(R/G) indicating the relationship between the ratio of R and G and the color temperature (K). Furthermore, FIG. 10B shows a graph of a function g(B/G) indicating the relationship between the ratio of B and G and the color temperature (K). These functions f(R/G) and g(B/G) are calculated from the equation of Planck relating to the spectral distribution of black body radiation, and the spectral characteristics of imaging elements for each of colors in which filters are included. Furthermore, the color temperature may be experimentally obtained using a known light source.

Depending on the type of the imaging unit 11, there is sometimes no table for conversion from RAW data into a color temperature. In this case, when conversion from RAW data into a color temperature is desired, the color temperature converter 142C calculates the ratio of RGB values of the RAW data, and refers to the calibration curve of FIG. 10A or FIG. 10B and performs conversion into a color temperature (arrow 9d). It should be noted that, also when converting JPEG RGB data into a color temperature for example, after the JPEG data has been converted into RAW data by using the conversion table provided by the manufacturer, FIG. 10A or FIG. 10B may be used to obtain a color temperature from the ratio of the RAW data.

The analysis unit 143 analyzes the relative relationship of the photometric information of a plurality of points converted by the photometric information converter 141, on the basis of data including that photometric information. For example, for two points on an image designated by the user via the operation unit 15, the analysis unit 143 calculates the difference in luminance of absolute luminance values calculated by the photometric information converter 141, and displays the difference in luminance on the display unit 16.

Furthermore, the analysis unit 143 analyzes the relative relationship of the colorimetric information of a plurality of points converted by the colorimetric information converter 142, on the basis of data including that colorimetric information. For example, for two points on an image designated by the user via the operation unit 15, the analysis unit 143 obtains a distance, a vector inner product, an outer product, an eigenvalue, and the like from the color information of two points in the color space calculated by the colorimetric information converter 142, and thereby calculates the relative relationship of the color information thereof. The analysis unit 143 then displays, on the display unit 16, the value of the calculated color difference (difference in values such as Lab, L*a*b*, Luv, L*u*v*, XYZ, and the like) for example.

Figure 11:
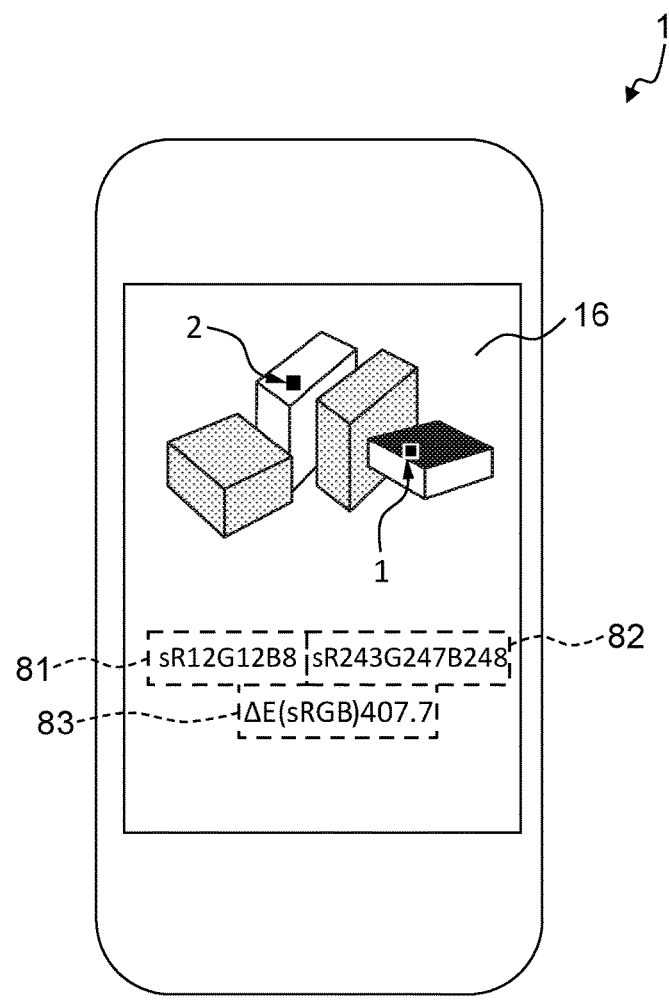
FIG. 11 is a drawing illustrating an example of a display screen for chromaticity values.

FIG. 11 is a drawing illustrating an example of a display screen for chromaticity values. FIG. 11 illustrates an example in which the user has selected the two points of "1" and "2" on an image displayed on the display unit 16 of a touch panel. Color information 81 for point "1" and color information 82 for point "2" are displayed at the lower side of the display unit 16. In this example, the color information 81 and 82 are sRGB values. The color difference 83 of the two points "1" and "2" obtained by the analysis unit 143 is then displayed below the color information 81 and 82.

Calculations for color difference and the like in which the measurement values of a plurality of points are used become possible by means of the analysis unit 143, and it also becomes possible for some determinations to be performed by the control unit 14 on the basis of those calculation results. For example, in the case of the display screen of FIG. 11, it becomes possible to determine by means of the control unit 14 whether or not the colors of the two points selected on the image are different and the like. In addition, that result can also be displayed on the display unit 16.

By referring to the reference information stored in the memory unit 13, the extraction unit 144 extracts, for a pixel designated by the user via the operation unit 15, the identification value of a color corresponding to the colorimetric information closest to the colorimetric information obtained by the colorimetric information converter 142. This reference information is, for example, a look-up table in which CIE XYZ values and identification values such as Munsell values or Pantone color catalog numbers are associated for each of a plurality of colors. For example, if one point on an image is selected by the user via the operation unit 15, the extraction unit 144 refers to the look-up table of the memory unit 13 on the basis of a CIE XYZ value calculated by the colorimetric information converter 142 for the selected point, and thereby extracts the identification value of the color closest to the color of the selected point.

Alternatively, the reference information may be a look-up table in which sRGB values and identification values are associated for each of a plurality of colors. In this case, if one point on an image is selected by the user via the operation unit 15, the extraction unit 144 refers to the look-up table of the memory unit 13 on the basis of the sRGB value of that point without using a CIE XYZ value, and thereby extracts the identification value of the color closest to the color of the selected point.

The identification value extracted by the extraction unit 144 is displayed on the display unit 16. By means of the extraction unit 144, conversion to a Munsell value or a Pantone color catalog value that cannot be performed by a simple matrix calculation and requires a look-up table also becomes possible. For example, it becomes possible for the user to select one point on an image, and acquire the identification value of a color sample book corresponding to a color displayed on the display unit 16.

The CAM converter 145 is an example of a converter, and includes a fifth converter 145A. The fifth converter 145A converts absolute luminance values obtained by the photometric information converter 141 (second converter 141C) for a measurement-target point on an image and a plurality of points peripheral thereto, and chromaticity values (CIE XYZ values, L*a*b* values, and the like) obtained by the colorimetric information converter 142 (third converter 142A or fourth converter 142B), into color information of a color space of a color appearance model such as CIECAM02 for example. The values of the color information obtained by the fifth converter 145A are displayed on the display unit 16. By means of the fifth converter 145A, it becomes possible to use the absolute luminance values and the chromaticity values of a plurality of points to display colors by means of a color appearance model, which is a means for expressing colors in the most accurate manner.

In should be noted that the analysis unit 143 may analyze the relative relationship of the color information of the plurality of points converted by the CAM converter 145. The extraction unit 144 may extract, for a designated pixel, the identification value of the color closest to the color information obtained by the CAM converter 145.

Furthermore, the control unit 14 does not necessarily have to include both functions of the photometric information converter 141 and the colorimetric information converter 142, and may include only either one of these. The control unit 14 may include only either one of the photometric information converter 141 and the colorimetric information converter 142, and the terminal device 1 may output only either one of the photometric information and the colorimetric information.

As has been described above, in the terminal device 1, photometric information (luminance values and illuminant values) and colorimetric information (color temperature of a light source and chromaticity values of a color space (color system)) can be measured in a simple manner without using an expensive special device. If all the necessary hardware is incorporated into a hand held instrument, it is possible to realize the terminal device 1 by just installing a program that realizes the function of the control unit 14.

Figure 12:
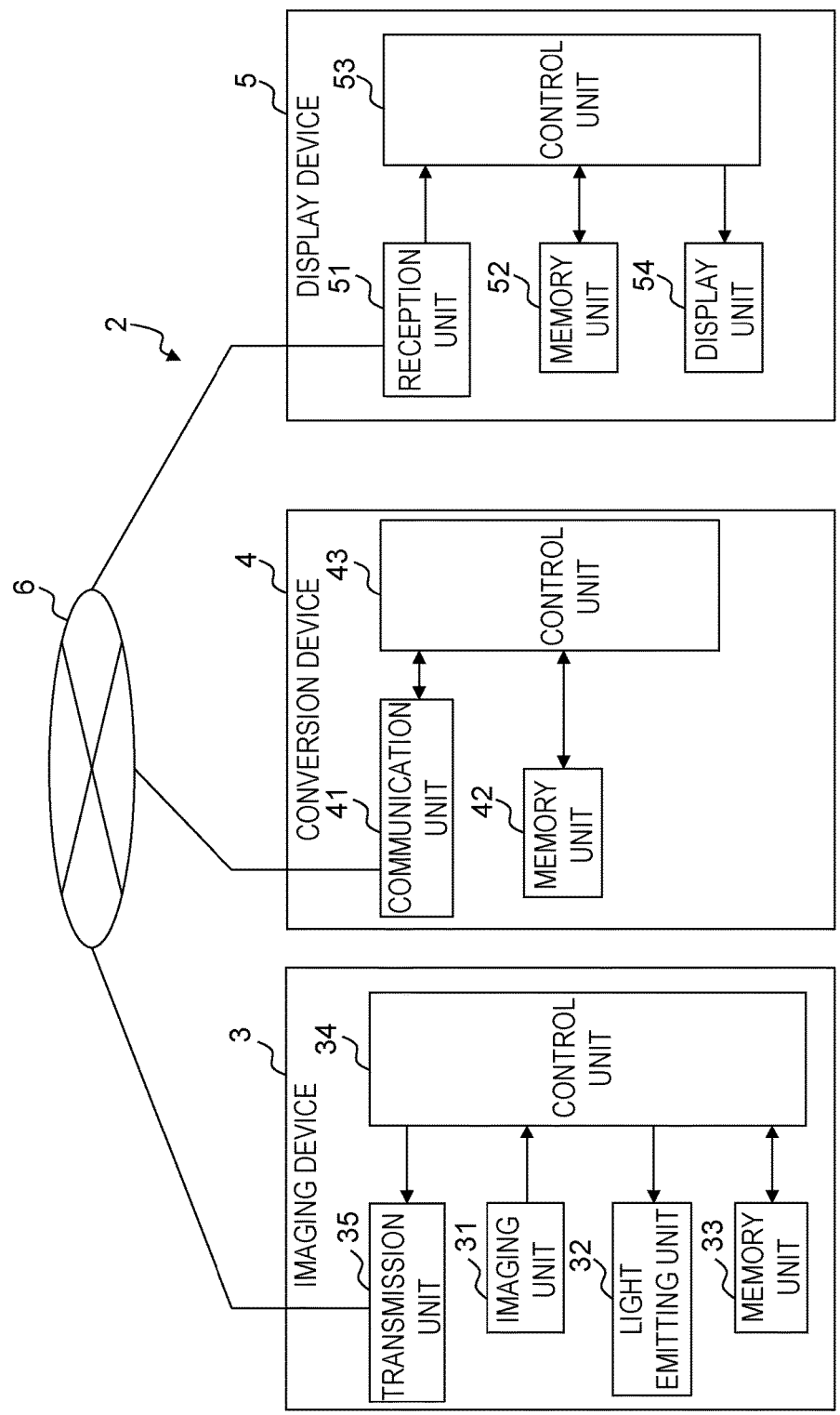
FIG. 12 is a schematic configuration of one embodiment of a communication system 2.

FIG. 12 is a schematic configuration of one embodiment of a communication system 2. The communication system 2 includes an imaging device 3, a conversion device 4, and a display device 5 capable of communicating with each other. These devices are connected to each other via a wired or wireless communication network 6.

The imaging device 3 includes an imaging unit 31, a light emitting unit 32, a memory unit 33, a control unit 34, and a transmission unit 35. The imaging unit 31 captures a measurement-target image, and acquires measurement-target image data in a format such as RAW (DNG) data, JPEG (JFIF) data, or sRGB data. The light emitting unit 32, if necessary, emits light when an image is being taken by the imaging unit 31. The memory unit 33 stores image data acquired by the imaging unit 31, and data and the like necessary for the operation of the imaging device 3. The control unit 34 includes a CPU, RAM, ROM, and the like, and controls the operation of the imaging device 3. The transmission unit 35 transmits, to the conversion device 4, the image data of the image acquired by the imaging unit 31 and the image data shooting information.

The conversion device 4 includes a communication unit 41, a memory unit 42, and a control unit 43. The communication unit 41 receives image data and image information from the imaging device 3, and transmits photometric information or colorimetric information obtained by the control unit 43, to the display device 5. The memory unit 42 stores the image data and image information received from the imaging device 3, and data and the like necessary for the operation of the conversion device 4. The control unit 43 includes a CPU, RAM, ROM, and the like, and controls the operation of the conversion device 4. The control unit 43 includes functions that are the same as those of the control unit 14 of the terminal device 1, and uses the image data and the image information received from the imaging device 3 to convert that image data into data including photometric information or colorimetric information.

The display device 5 includes a reception unit 51, a memory unit 52, a control unit 53, and a display unit 54. The reception unit 51 receives photometric information or colorimetric information from the conversion device 4. The memory unit 52 stores the photometric information or the colorimetric information received from the conversion device 4, and data and the like necessary for the operation of the display device 5. The control unit 53 includes a CPU, RAM, ROM, and the like, and controls the operation of the display device 5. The display unit 54 is a liquid crystal display for example, and displays the photometric information or the colorimetric information received by the reception unit 51.

In this way, the capturing of an image, the conversion of photometric information or colorimetric information, and the display of conversion results may each be performed by a separate device. In particular, if complex conversion calculations and comparisons with databases are performed by a high-performance conversion device 4 (server), it becomes possible to increase the speed and accuracy of processing, and to improve data storage/management capabilities.

It should be noted that a computer program for realizing each of the functions of a converter on a computer may be provided by being recorded on a computer readable recording medium such as a magnetic recording medium, an optical recording medium, or the like.

Exemplary Embodiments

Item 1. An apparatus comprising: an imaging unit that acquires image data of an image; a converter that uses image data shooting information to convert the image data into data including photometric information or colorimetric information; and an output unit that outputs the photometric information or the colorimetric information obtained by the converter.

Item 2. The apparatus according to Item 1, further comprising a position designation unit that designates a position of a pixel included in the image, wherein the output unit is a display unit that displays the photometric information or the colorimetric information obtained by the converter for the pixel designated by the position designation unit.

Item 3. The apparatus according to Item 2, wherein the converter comprises:

a first converter that converts the image data of the image acquired by the imaging unit into data including a relative luminance value;

a reference luminance value acquiring unit that uses the image data shooting information to obtain a reference luminance value of a subject included in the image; and a second converter that uses the reference luminance value to convert the relative luminance value into an absolute luminance value; and the display unit displays the absolute luminance value obtained by the second converter.

Item 4. The apparatus according to Item 3, wherein the second converter obtains a linear relative luminance value by converting the relative luminance value into a linear scale, and uses the reference luminance value to convert the linear relative luminance value into the absolute luminance value.

Item 5. The apparatus according to Item 3 or 4, wherein the display unit displays the absolute luminance value for each pixel of the image by means of colors that differ in accordance with a plurality of discretely set sections to which the absolute luminance value in question belongs.

Item 6. The apparatus according to any one of Items 2 to 5, wherein the converter extracts the image information from image information associated with the image data acquired by the imaging unit.

Item 7. The apparatus according to Item 2, wherein the converter comprises a third converter that uses the image information to convert color information of a color space included in the image data of the image acquired by the imaging unit, into color information of another color space; and the display unit displays a value of the color information of the other color space obtained by the third converter.

Item 8. The apparatus according to Item 7, wherein the image information is image information associated with the image data.

Item 9. The apparatus according to Item 7 or 8, wherein the converter further comprises a fourth converter that converts the color information of the other color space obtained by the third converter into yet another color space; and the display unit displays a value of the color information of the yet another color space obtained by the fourth converter.

Item 10. The apparatus according to Item 3 or 4, wherein the converter further comprises:

a third converter that uses the image information to convert color information of a color space included in the image data of the image acquired by the imaging unit, into color information of another color space; and a fifth converter that converts the absolute luminance value obtained by the second converter for each of a plurality of points in the image and the color information of the other color space obtained by the third converter, into color information of a color space of a color appearance model; and the display unit displays a value of the color information obtained by the fifth converter.

Item 11. The apparatus according to Item 3 or 4, wherein the converter further comprises:

a third converter that uses the image information to convert color information of a color space included in the image data of the image acquired by the imaging unit, into color information of another color space;

a fourth converter that converts the color information of the other color space obtained by the third converter into yet another color space; and a fifth converter that converts the absolute luminance value obtained by the second converter for each of a plurality of points in the image and the color information of the yet another color space obtained by the fourth converter, into color information of a color space of a color appearance model; and the display unit displays a value of the color information obtained by the fifth converter.

Item 12. The apparatus according to any one of Items 2 to 11, further comprising an analysis unit that analyzes a relative relationship of the photometric information or the colorimetric information of the plurality of points on the basis of the data including the photometric information or the colorimetric information of the plurality of points converted by the converter; wherein the display unit displays a value obtained by the analysis unit.

Item 13. The apparatus according to any one of Items 7 to 11, further comprising: a memory unit that stores reference information in which colorimetric information and an identification value are associated for each of a plurality of colors; and an extraction unit that refers to the reference information and thereby extracts, for the pixel designated by the position designation unit, an identification value of a color corresponding to the colorimetric information closest to the colorimetric information obtained by the converter; wherein the display unit displays the identification value of the color extracted by the extraction unit.

Item 14. A system comprising an imaging device, a conversion device, and a display device capable of communicating with each other;

the imaging device including:

an imaging unit that acquires image data of an image; and a transmission unit that transmits the image data of the image acquired by the imaging unit and image data shooting information to the conversion device;

the conversion device including:

a converter that uses the image data shooting information to convert the image data into data including photometric information or colorimetric information; and a communication unit that receives the image data and the image information from the imaging device, and transmits the photometric information or the colorimetric information obtained by the converter to the display device; and the display device including:

a reception unit that receives the photometric information or the colorimetric information from the conversion device; and a display unit that displays the photometric information or the colorimetric information received by the reception unit.

Item 15. A program that instructs a computer to:

acquire image data of an image taken by an imaging device and image data shooting information;

convert the image data into data including photometric information or colorimetric information by using the image information; and output the photometric information or the colorimetric information.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. An apparatus comprising:
an imaging unit that acquires image data of an image;
a converter that uses image data shooting information to convert the image data into data including photometric information or colorimetric information; and
an output unit that outputs the photometric information or the colorimetric information obtained by the converter,
wherein the converter comprises:
a first converter that converts the image data of the image acquired by the imaging unit into data including a relative luminance value;
a reference luminance value acquiring unit that uses the image data shooting information to obtain a reference luminance value of a subject included in the image; and
a second converter that uses the reference luminance value to convert the relative luminance value into an absolute luminance value.

2. The apparatus according to claim 1, further comprising a position designation unit that designates a position of a pixel included in the image, wherein
the output unit is a display unit that displays the photometric information or the colorimetric information obtained by the converter for the pixel designated by the position designation unit.

3. The apparatus according to claim 1, wherein
the display unit displays the absolute luminance value obtained by the second converter.

4. The apparatus according to claim 3, wherein the second converter obtains a linear relative luminance value by converting the relative luminance value into a linear scale, and uses the reference luminance value to convert the linear relative luminance value into the absolute luminance value.

5. The apparatus according to claim 3, wherein the display unit displays the absolute luminance value for each pixel of the image by means of colors that differ in accordance with a plurality of discretely set sections to which the absolute luminance value in question belongs.

6. The apparatus according to claim 2, wherein the converter extracts the image information from image information associated with the image data acquired by the imaging unit.

7. The apparatus according to claim 2, wherein the converter comprises a third converter that uses the image information to convert color information of a first color space included in the image data of the image acquired by the imaging unit, into color information of a second color space; and
wherein the display unit displays a value of the color information of the other color space obtained by the third converter.

8. The apparatus according to claim 7, wherein the image information is image information associated with the image data.

9. The apparatus according to claim 7, wherein the converter further comprises a fourth converter that converts the color information of the second color space obtained by the third converter into a third color space; and
the display unit displays a value of the color information of the third color space obtained by the fourth converter.

10. The apparatus according to claim 2, wherein the converter further comprises:
a third converter that uses the image information to convert color information of a first color space included in the image data of the image acquired by the imaging unit, into color information of a second color space; and
a fifth converter that converts the absolute luminance value obtained by the second converter for each of a plurality of points in the image and the color information of the second color space obtained by the third converter, into color information of a third color space of a color appearance model; and
the display unit displays a value of the color information obtained by the fifth converter.

11. The apparatus according to claim 2, wherein the converter further comprises:
a third converter that uses the image information to convert color information of a first color space included in the image data of the image acquired by the imaging unit, into color information of a second color space;
a fourth converter that converts the color information of the second color space obtained by the third converter into a third color space; and
a fifth converter that converts the absolute luminance value obtained by the second converter for each of a plurality of points in the image and the color information of the third color space obtained by the fourth converter, into color information of a fourth color space of a color appearance model; and
the display unit displays a value of the color information obtained by the fifth converter.

12. The apparatus according to claim 2, further comprising an analysis unit that analyzes a relative relationship of the photometric information or the colorimetric information of the plurality of points on the basis of the data including the photometric information or the colorimetric information of the plurality of points converted by the converter;
wherein the display unit displays a value obtained by the analysis unit.

13. The apparatus according to claim 7, further comprising: a memory unit that stores reference information in which colorimetric information and an identification value are associated for each of a plurality of colors; and
an extraction unit that refers to the reference information and thereby extracts, for the pixel designated by the position designation unit, an identification value of a color corresponding to the colorimetric information closest to the colorimetric information obtained by the converter;
wherein the display unit displays the identification value of the color extracted by the extraction unit.

14. A system comprising an imaging device, a conversion device, and a display device capable of communicating with each other;
the imaging device including:
an imaging unit that acquires image data of an image; and
a transmission unit that transmits the image data of the image acquired by the imaging unit and image data shooting information to the conversion device;

the conversion device including:
a converter that uses the image data shooting information to convert the image data into data including photometric information or colorimetric information; and
a communication unit that receives the image data and the image information from the imaging device, and transmits the photometric information or the colorimetric information obtained by the converter to the display device; and the display device including:
a reception unit that receives the photometric information or the colorimetric information from the conversion device; and
a display unit that displays the photometric information or the colorimetric information received by the reception unit, wherein the converter comprises:
   a first converter that converts the image data of the image acquired by the imaging unit into data including a relative luminance value;
   a reference luminance value acquiring unit that uses the image data shooting information to obtain a reference luminance value of a subject included in the image; and
   a second converter that uses the reference luminance value to convert the relative luminance value into an absolute luminance value.

* * * * *